May 3, 1932. E. W. SCHELLENTRAGER ET AL 1,856,787
VEHICLE
Filed Jan. 30, 1929  6 Sheets-Sheet 2
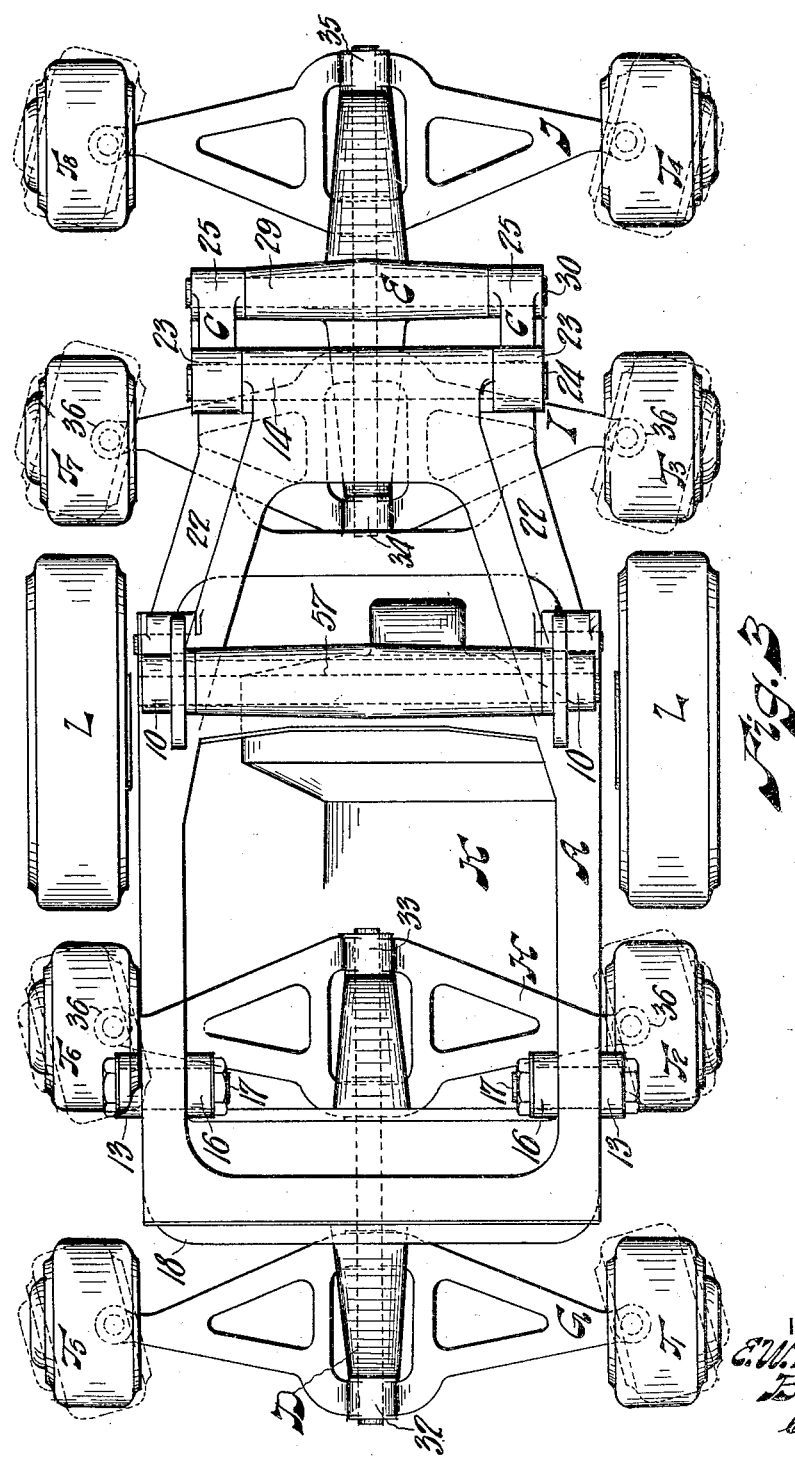
INVENTORS
E.W.Schellentrager
B.E.Clarkson
C.F.Heinkel
ATTORNEY

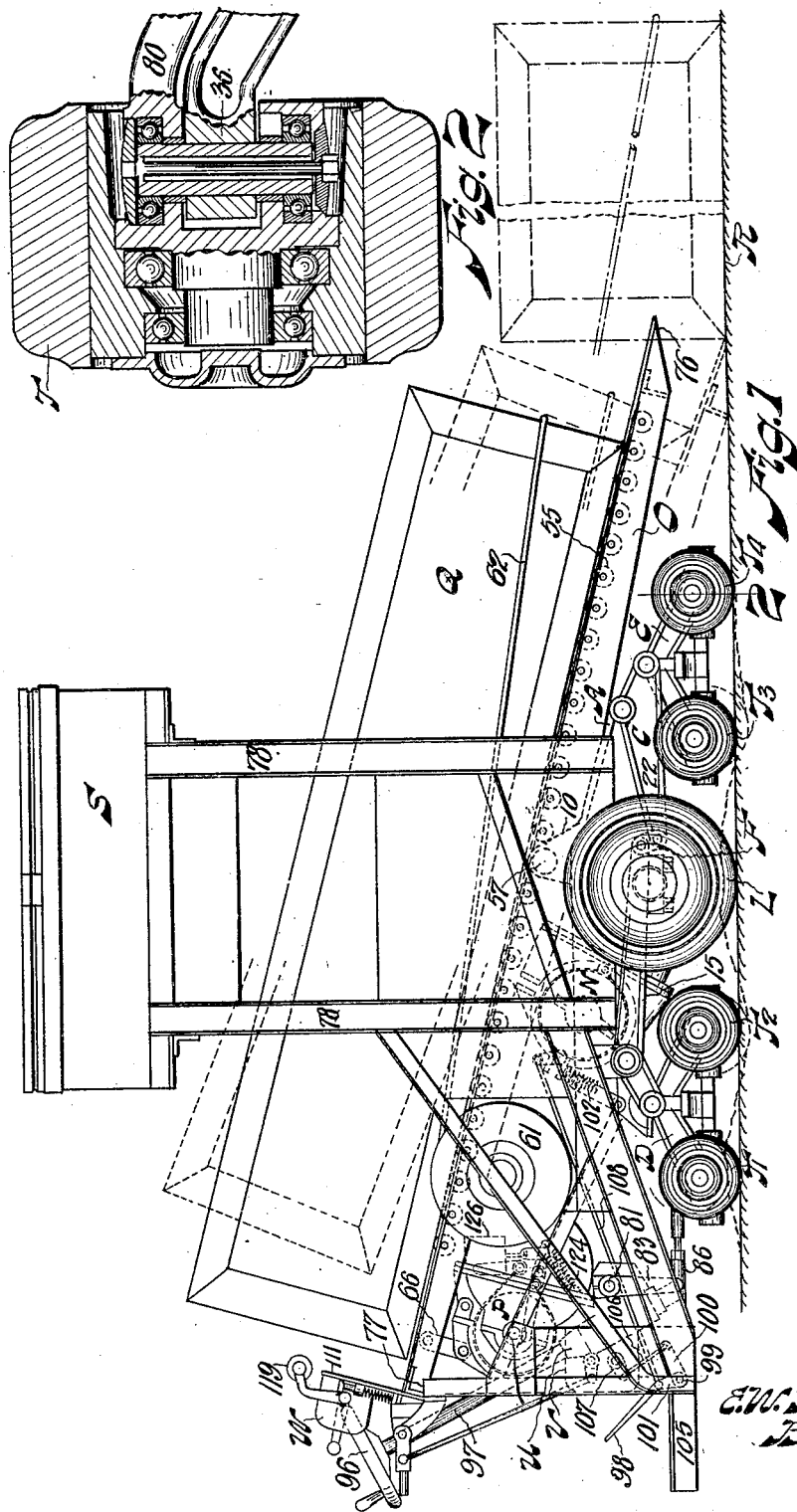

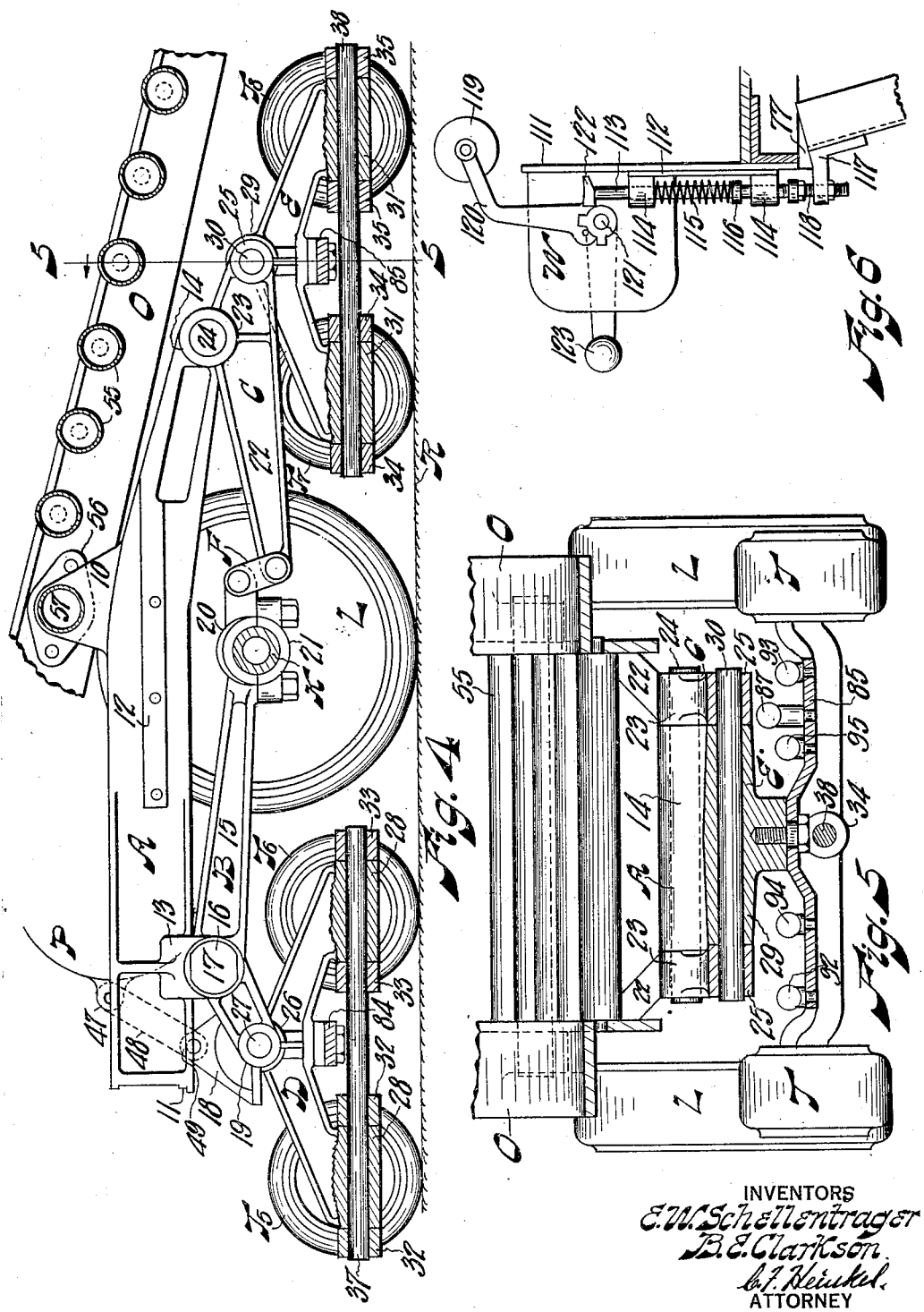

May 3, 1932.  E. W. SCHELLENTRAGER ET AL  1,856,787
VEHICLE
Filed Jan. 30, 1929   6 Sheets-Sheet 4
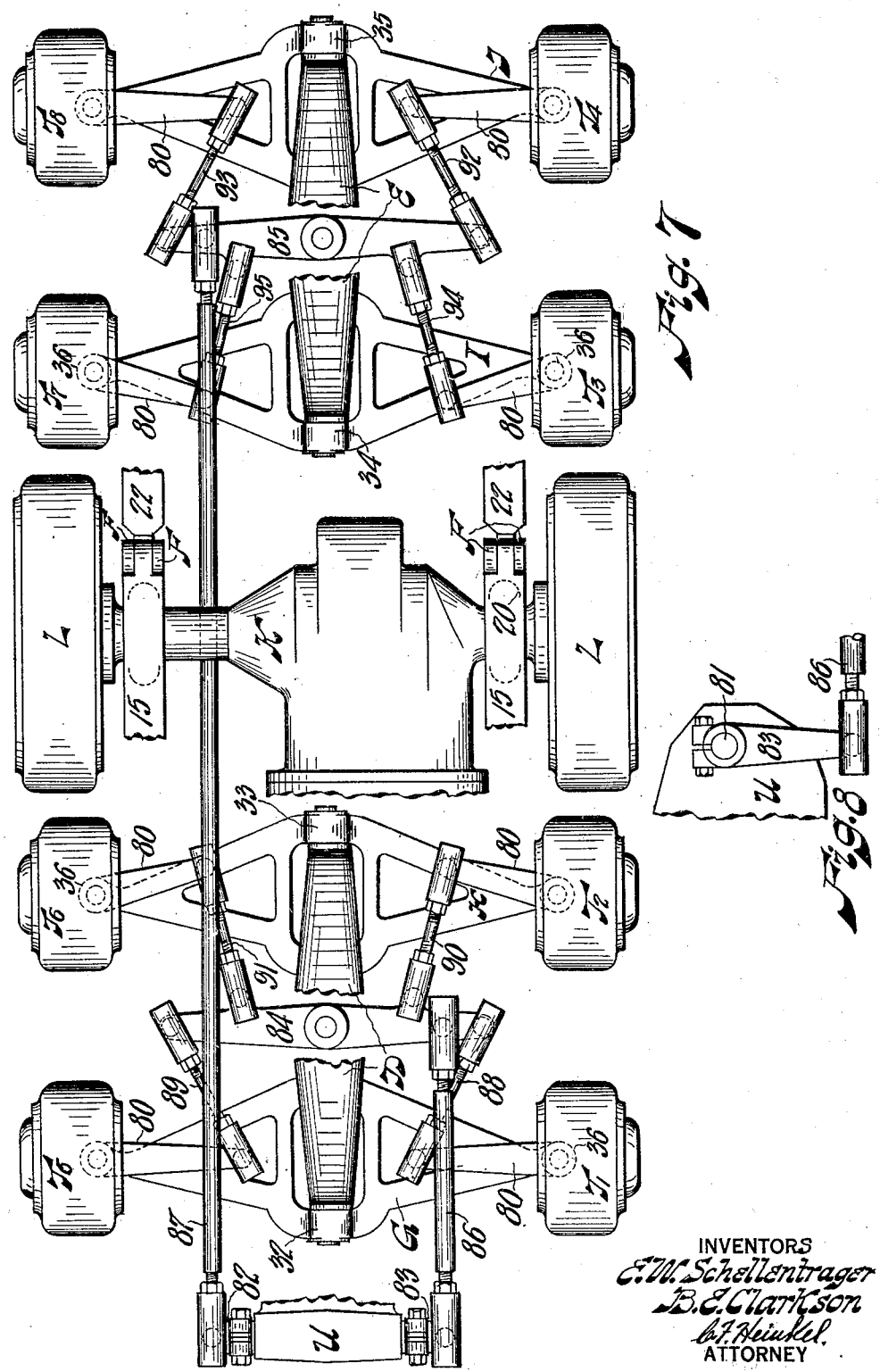

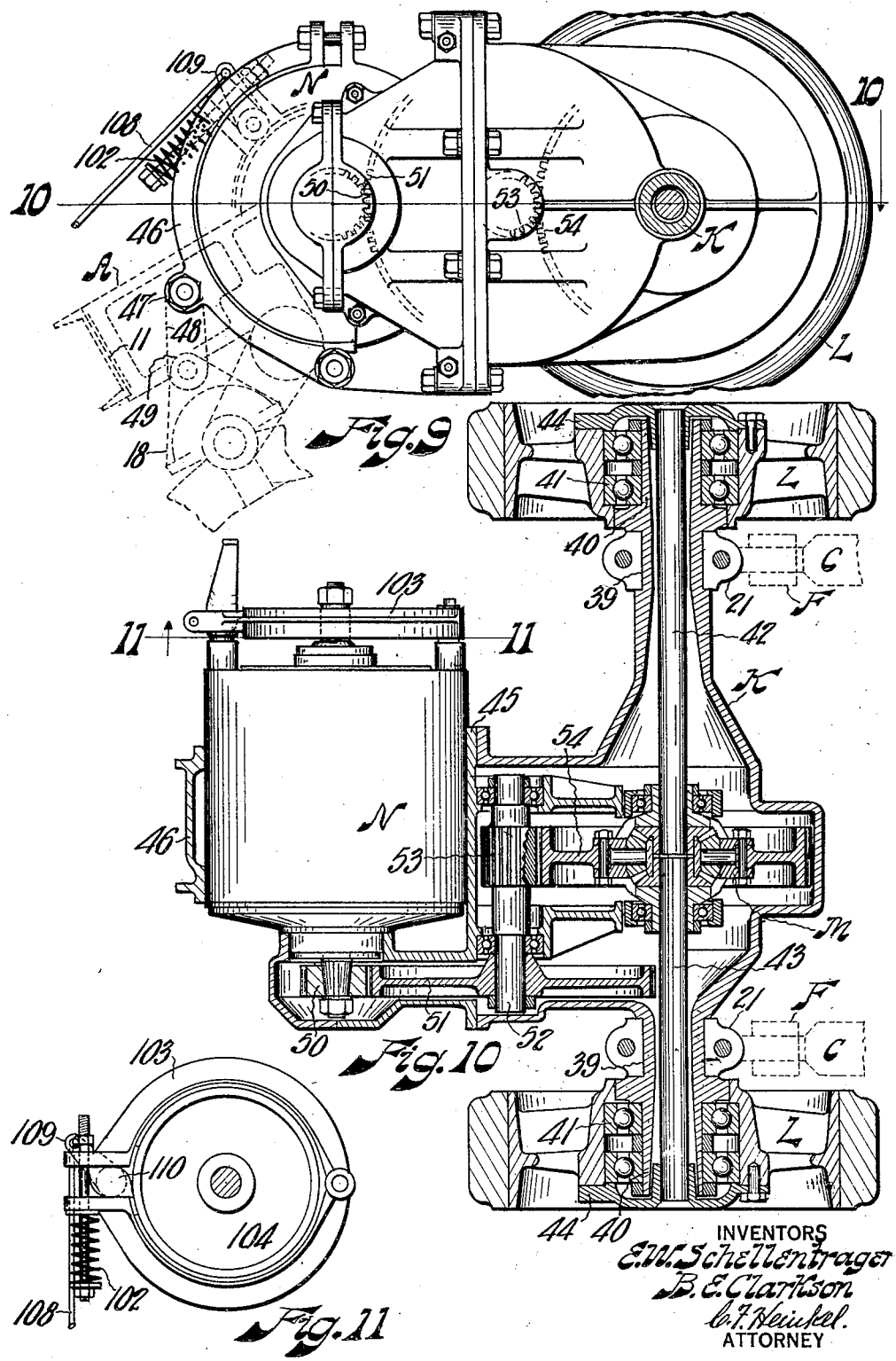

May 3, 1932. E. W. SCHELLENTRAGER ET AL 1,856,787
VEHICLE
Filed Jan. 30, 1929  6 Sheets-Sheet 6
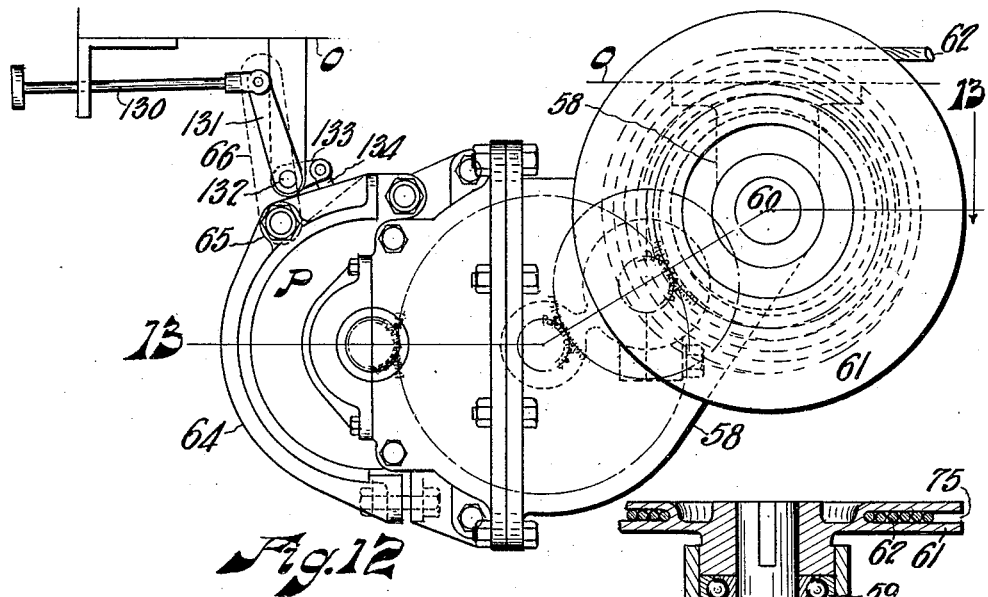
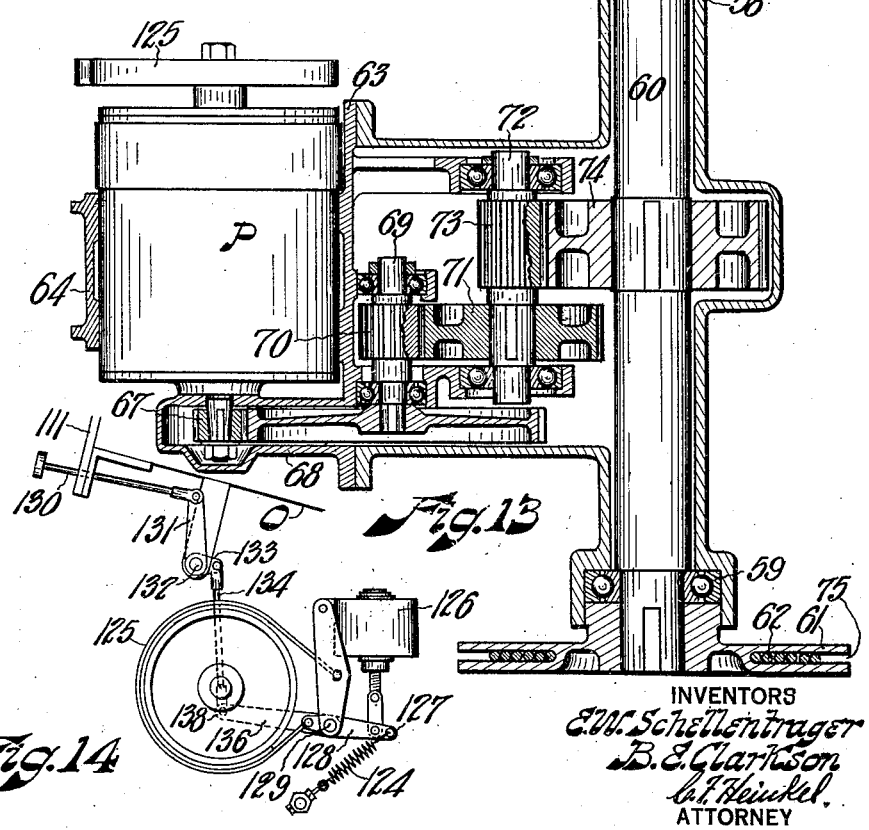
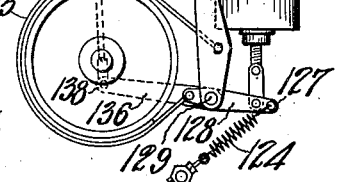
INVENTORS
E.W. Schellentrager
B.E. Clarkson
C.F. Heinkel
ATTORNEY Patented May 3, 1932

1,856,787

UNITED STATES PATENT OFFICE

EUGENE W. SCHELLENTRAGER, OF SHAKER HEIGHTS, AND BRADLEY E. CLARKSON, OF CLEVELAND, OHIO, ASSIGNORS TO ATLAS BOLT & SCREW COMPANY, OF CLEVELAND, OHIO

VEHICLE

Application filed January 30, 1929. Serial No. 336,037.

Our invention relates to vehicles generally and more particularly to dirigible power or self propelling and self loading vehicles.

Objects of our invention are:—a vehicle of simple structure; easy of operation; self propelling, self loading and self unloading; steerable into and in, and operable in inconvenient or inconveniently accessible places and in limited spaces; of minimum dimensions; distributing a load thereon proportionately on all of the wheels thereof; keeping all of the wheels thereof in constant contact on even or on uneven floors; requiring no extensions to move a load onto or from the same; and provided with sufficient safety means. Other objects will be pointed out in this specification, or will become obvious or will suggest themselves therein or from an inspection of the accompanying drawings.

In many instances, it is quite desirable that a vehicle has a load carrying platform with a large loading area while the space available for the vehicle to work in is comparatively small.

In vehicles, commonly called commercial trucks, for instance, it is quite desirable that there is a large platform area and that the vehicle can turn sharp corners and is otherwise easily steerable into various paths.

In loading or unloading material into and from box cars, with such a truck, for instance, it is necessary that the truck can enter the door of the box car as well as move about in the box car among goods therein and to discharge goods from the truck while the same is in the car and to fill the same while the truck moves periodically into and out of the car and among the goods to avoid manual or other handling of the goods, or to pick up goods in the car and to remove them from the car without manual or other handling of them. Applicants have recognized these wants or desirable conditions and have discovered the necessary means to satisfy these wants or desires and have exemplified their invention in a device shown in the accompanying drawings and explain in detail in this specification the particular exemplification so shown and suggestively and particularly mention therein some modification or equivalent features as a further aid in understanding the invention but they are aware that their invention can be applied to vehicles other than the one so shown and described or pointed out.

In the accompanying drawings mentioned:—

Fig. 1 is a side view of a vehicle embodying our invention; showing in full lines, the platform in normal load carrying position with a load thereon and the battery above the platform and, in dotted lines, the platform tilted into load receiving or load discharging position and, in dot and dash lines, a load on a floor ready for moving onto the platform or just removed from the same. This view also shows, in dotted lines, an uneven floor and all the wheels in contact thereon.

Fig. 2 is a conventional sectional view showing one manner of mounting the steering wheels. The section being taken in a vertical plane indicated by the line 2 in Fig. 1.

Fig. 3 is a plan view of the articulate frame with wheels thereon.

Fig. 4 is a side view of the frame partly in section to more clearly show longitudinal relations between parts.

Fig. 5 is a transverse section taken in a vertical plane indicated by the line 5—5 in Fig. 4 more clearly showing transverse relations of parts.

Fig. 6 is a side view of the loading and unloading control means.

Fig. 7 is a plan view of the steering means or mechanism.

Fig. 8 is a side view of a portion of the steering case showing the manner of connecting the steering mechanism with the same.

Fig. 9 is a side view of the propelling power means.

Fig. 10 is a longitudinal section taken in a horizontal plane indicated by the line 10—10 in Fig. 9 and shows more clearly the gearing from the motor to the drive axle and to the drive wheels.

Fig. 11 is a section taken in a vertical plane indicated by the line 11—11 in Fig. 10 and shows the motor brake and mechanism more clearly.

Fig. 12 is a side view of loading and unloading power means.

Fig. 13 is a longitudinal section taken in a horizontal plane indicated by the line 13—13 in Fig. 12 and shows more clearly the gearing from the motor to the sheave axle.

Fig. 14 is a side view of the brake and control means for the loading and unloading means.

Similar reference characters refer to similar parts throughout the views.

The vehicle shown in the drawings, a wheeled self propelled loading and self unloading vehicle in this instance, comprises, principally, a frame, a load carrying platform thereon, drive and steering wheels carried by the frame, a steering mechanism for the steering wheels, a source of power supported on the frame in the form of a storage battery in this instance, power means to propel the vehicle and to load the same, control means for the vehicle, and safety means for the vehicle.

The frame shown is articulate and comprises the parts A, B, C, D, and E hinged together for purposes explained later as most clearly seen in Figs. 3 and 4 and 5.

The part A has two sidewise spaced trunnion lugs 10 for the platform described later and also has the end face 11 and the side faces 12 against which the structural members forward of the part A as well as the support members of the later described storage battery are fastened and also has the downwardly extending sidewise spaced trunnion bosses 13 near one end thereof and also has the trunnion boss 14 at the other end thereof.

The parts B and C shown comprise an articulated member or arm for compensating purposes described later and are pivotally connected to each other by means of the links F to permit of free articulation thereof and to prevent binding between members when the parts B and C function articulately.

The part B has the sidewise spaced arm like members 15 each having the trunnion boss 16 corresponding to the bosses 13 with the pins 17 through the same to form a hinge joint between the parts A and B. The member 18 connects one end of the members 15 and has the sidewise spaced trunnion bosses 19. The other end of each member 15 has the journal bearing part 20 and the cap 21 bolted thereon to form a complete journal bearing for the axle housing to be described later.

The part C has the sidewise spaced arm-like members 22 each having the trunnion boss 23 corresponding to the boss 14 with the pin 24 through the same to form a hinge joint between the parts A and C. The part C also has the trunnion bosses 25 on the outer ends of the members 22.

The part D has the trunnion boss 26 extending between the bosses 19 with the hinge pin 27 through the same to form a hinge joint between the parts B and D and also has the two trunnion bosses 28 in the present instance having the longitudinal axis thereof at right angles to the pin 27.

The part E has the trunnion boss 29 extending between the bosses 25 with the hinge pin 30 through the same to form a hinge joint between the parts C and E and also has the two trunnion bosses 31 in the present instance having the longitudinal axis thereof at right angles to the pin 30.

When a vehicle is to have more or less steering wheels than shown, the number of bosses 28 and 31 or 28 or 31 can be increased or decreased as desired.

For the purpose of simplicity, the parts D and E are shown as duplicates.

The steering wheel carriers G, H, I and J shown, four in the present instance, are duplicates for simplicity purposes.

The carrier G has the two trunnion bosses 32 straddling one of the bosses 28 on the part D and the carrier H has the two trunnion bosses 33 straddling the other one of the bosses 28 on the part D.

The carrier I has the two trunnion bosses 34 straddling one of the bosses 31 on the part E and the carrier J has two trunnion bosses 35 straddling the other one of the bosses 31.

Each of the carriers has the eye 36 on each end thereof to support the steering wheels described later.

The hinge pin 37 extends through the bosses 28 and 32 and 33 to form a hinge joint between the part D and each of the carriers G and H and the hinge pin 38 extends through the bosses 31 and 34 and 35 to form a hinge joint between the part E and each of the carriers I and J.

In the frame structure so far described, the parts B and C can pivot on the part A on an axis transversely of the vehicle; the parts D and E can pivot on the parts B and C on an axis traversely of the vehicle; the carrier G can pivot on the part D on an axis longitudinally of the vehicle; the carrier H can pivot on the part D on an axis longitudinally of the vehicle and independently of the carrier G; the carrier I can pivot on the part E on an axis longitudinal of the vehicle; and the carrier J can pivot on the part E on an axis longitudinal of the vehicle; therefore, the parts B and C can pivot independently on the part A on an axis transversely of the vehicle; the parts D and E can pivot independently on the parts B and C on an axis transversely of the vehicle; each of the carriers G, H, I and J can pivot independently on the parts D and E on an axis longitudinal of the vehicle; and the carriers G and H and I and J can also pivot in pairs with the parts D and E on an axis transversely of the vehicle.

The drive or vehicle propelling means, in the present instance, comprises one drive axle with a drive wheel on each end thereof; the drive wheels being rotatable at different speeds and thereby facilitating the steering of the vehicle particularly on what is commonly called short curves to permit the vehicle to enter places otherwise inaccessible.

The drive axle housing K has the journal portions 39 adapted to the journal bearings formed by the journal bearing parts 20 and the caps 21 thereon on the members 15 of the part B and also has ends 40 to receive the ball bearings 41 between the drive wheels L and the ends 40 so that the drive wheels can rotate easily and freely on the housing.

The drive axle, in the present instance, comprises the parts 42 and 43 disposed longitudinally end to end and connected at the juncture thereof by the differential gearing M of any suitable structure and carrying the drive gear. The disks 44 rotate with the corresponding axle parts as the differential gearing rotates the same and are secured to the wheels L to rotate the same with the corresponding axle part.

The vehicle propelling motor N, one of the power means of the vehicle, is seated in the bracket 45 fastened to the housing K and is held in its seat by the strap 46 which has the boss 47. The links 48 have one end thereof pivoted on the boss 47, extend downwardly, and have the other end thereof pivoted on the bosses 49 on the tie member 18. This link connection flexibly supports one end of the vehicle propelling power means and the journals 39 support the other end thereof in a positive gear distance relation to the drive axle.

The pinion 50 rotates with the shaft of the motor N and meshes with the gear 51 rotatable with the shaft 52 journaled in the bracket 45. The pinion 53 rotates with the shaft 52 and meshes with the previously mentioned drive gear 54 on the differential gearing M.

This motor and gear arrangement constitutes a speed reduction and drive means between the motor and the drive axle, through the differential gearing to propel the vehicle at a desirable speed and to permit the two drive wheels to rotate at different speeds when the vehicle follows a curved path and thereby permits the vehicle to travel freely in curved paths and permits both wheels to roll freely on the floor.

The load carrying platform O, in the present instance, has the rollers 55 to facilitate movement of a load on the platform and also has the lugs 56 corresponding to the lugs 10 on the frame part A and the pin 57 extending through the lugs to form a pivot for the platform on the frame.

The housing 58 is carried on the underside of the platform, forwardly of the pin 57, and carries the ball bearings 59 which support the rotatable shaft 60. The grooved rope sheaves 61 are secured to the ends of the shaft 60 and rotate therewith.

The rope 62 has one end thereof secured to one of the sheaves, the other end thereof secured to the other one of the sheaves, and the remaining portion extending from the sheaves in loop fashion to engage the back of the goods on the platform or to be loaded onto or discharged from the platform.

The load moving motor P, another one of the power means of the vehicle, is seated in the bracket 63 fastened to housing 58 and is held in its seat by the strap 64 which has the boss 65. The links 66 have one end thereof pivoted in the boss 65, extend upwardly, and have the other end thereof pivoted on the bottom of the platform. This link connection flexibly supports one end of the load moving power means and the ball bearings 59 retain the shaft 60 in a positive gear distance relation to the motor.

The pinion 67 rotates with the shaft of the motor P and meshes with the gear 68 rotatable with the shaft 69 journaled in the bracket 63. The pinion 70 rotates with the shaft 69 and meshes with the gear 71 rotatable with the shaft 72 journaled in the bracket 63. The pinion 73 rotates with the shaft 72 and meshes with the gear 74 rotatable with the shaft 60.

This motor and gear arrangement constitutes a speed reduction and load moving means between the motor and the sheave axle and is carried forward of the axis of pivot of the platform and the entire load moving means moves with the platform.

For efficiency of moving a load on the platform, it is desirable that the pulling portion of the rope is above the platform; therefore, the sheaves are journaled on the platform so that they move therewith and always retain a definite relation to the top of the platform and the grooved portion of the sheaves is above the top of the platform.

A feature of this invention is a minimum width of the device to permit the same to enter and to move in and operate in narrow spaces. Applicant has discovered, as an aid to attain his minimum width feature, that a sheave wheel could have a deep groove so that a cable or rope could be wound thereon radially in single file.

In the device shown, each of the sheave wheels 61 has the groove 75 sufficiently wide to permit the rope 62 to enter the same and sufficiently deep to permit a portion of the rope to wind on the sheave, one turn over the next one radially, and thereby pull the load Q onto the platform when the motor P is operating or to pay out this wound up rope when the load is being discharged from the platform.

As mentioned above, the platform is pivoted to swivel or tilt on the frame. This pivot is a sufficient distance above the frame, and the frame is otherwise constructed, to permit the end 76, herein considered as the loading or rear end pointed to permit the same to easily engage a load on the floor R or cause a load to be easily moved onto the platform, to be contacted on the floor for load receiving or load discharging purposes.

In the present instance, the axis of the pivot pin 57 is located rearwardly of the axis of the drive axle 43 so that the center of gravity of a load on the platform is directly above the drive axle and forwardly of the pivot pin and thereby help in the proportionate distribution of the load on all of the wheels of the vehicle with particular reference to the drive wheels and also help to hold the forward end down and to hold the platform in load carrying position.

The platform itself, with the parts carried by the same or connected with the same, has the axis of the pivot pin 57 rearwardly of the center of gravity of the platform so that the forward end of the platform normally and automatically tends to move downward against the stop 77 and thereby normally remain in load carrying position. The location of this center of gravity of the platform is so arranged that the platform is normally held in load carrying position and that the forward end thereof can easily be raised manually from the load carrying position thereof to move the rear end thereof toward the floor.

A feature of this invention is a vehicle of minimum lateral dimensions. Applicant has discovered that the lateral dimensions of such devices can be decreased materially by placing all possible mechanism either directly under or directly over the platform. In the vehicle shown, the power and operating mechanism is located below the platform and substantially within the lateral boundaries thereof and the power source is located above the platform and substantially within the lateral boundaries thereof. Other distributions of power source and power and operating means disposed or located substantially within the lateral boundaries of the platform can be made.

As shown, the uprights 78 are secured to the faces 11 and 12 on the part A and to the structure forward of the part A. The power source, in the present instance an electric storage battery S is supported on the uprights a sufficient distance above the platform O to clear a load thereon when the same is in load receiving or load discharging position.

The device shown has eight steering or steerable wheels T although any other number of such wheels can be used.

Each of the wheels T is rotatable on an axle 79 supported on the eye 36 on one end of one of the carriers G, H, I, or J and swivable on this eye on a vertical axis and having the steering arm 80.

The steering means or mechanism includes the hand operated device U having the rotatable shaft 81 with the cranks 82 and 83 on the ends thereof and rotatable therewith and also includes the mechanism which will now be described.

The lever 84 is pivoted on the part D and the lever 85 is pivoted on the part E of the frame.

The connector 86 connects the free end of the crank 83 to the lever 84 and the connector 87 connects the free end of the crank 82 to the lever 85.

One end of the connector 88 is pivotally connected to the arm 80 of the wheel T1 and the other end is pivotally connected to one end of the lever 84. One end of the connector 89 is pivotally connected to the arm 80 of the wheel T5 and the other end pivotally connected to the other end of the lever 84. One end of the connector 90 is pivotally connected to the arm 80 of the wheel T2 and the other end is pivotally connected to the lever 84 intermediate the pivots of the lever and of the connector 88. One end of the connector 91 is pivotally connected to the arm 80 of the wheel T6 and the other end is pivotally connected to the lever 84 intermediate the pivots of the lever and of the connector 89. One end of the connector 92 is pivotally connected to the arm 80 of the wheel T4 and the other end is pivotally connected to one end of the lever 85. One end of the connector 93 is pivotally connected to the arm 80 of the wheel T8 and the other end is pivotally connected to the other end of the lever 85.

One end of the connector 94 is pivotally connected to the arm 80 of the wheel T3 and the other end is pivotally connected to the lever 85 intermediate the pivots of the lever and the connector 92. One end of the connector 95 is pivotally connected to the arm 80 of the wheel T7 and the other end is pivotally connected to the lever 85 intermediate the pivots of the lever and the connector 93.

All of the arms of the wheels and the connectors are so proportioned and arranged and disposed that all of the wheels steer in unison in a manner to permit all of the wheels to roll freely on a floor in a straight path as well as in a curved path.

A feature of this invention is to permit the vehicle to move into or in places not accessible to the usual vehicles and to turn sharp corners or run on paths of short radius to reach such places. Applicant has discovered that a vehicle steered at both ends can turn on a shorter radius than one steered at one end and has not only devised a steering means to enable a vehicle to run on a path of short radius but also has placed the major portions of the steering mechanism as well as of the wheels and operating mechanism under the platform to attain minimum lateral dimensions of the vehicle.

As an aid to simplicity, the steering wheels and axles and connectors and levers and pivoting means are duplicates.

A feature of this invention is to facilitate the moving of a load onto and from the platform. To attain this feature, the platform is pivoted or tiltable as described above and the load carrying surface thereof is inclined to the floor when the platform is in load carrying position.

This inclination of the load carrying surface affords a good grip of the rope on the end of the load and permits the load to move off of the platform without aid when the rope is released and thereby requires no power to unload the vehicle. When the load has moved on the platform, in an unloading direction, to a position where the center of gravity thereof is beyond the axis of pivot of the platform, the weight of the load automatically tilts the rear or loading end of the platform toward the floor and thereby establishes a direct and uninterrupted runway for the load from the platform to the floor.

The platform can be arranged so that the load carrying surface thereof is level when the vehicle is in load carrying condition.

A feature of this invention is an efficient and easily operable control means for the operation of the vehicle as a whole and for the handling of a load onto and from the vehicle.

The steering wheel 96 is manually operable to rotate the shaft 97 which rotates the shaft 81 and the cranks 82 and 83 thereon and thereby swivels the wheels T on the vertical pivot axes thereof through the mechanism described above and thereby steers the vehicle into straight or curved paths including curved paths of a very short radius. The steering elements shown bear a certain steering relation to each other; when a different steering relation is desired, the length of the steering arms or the angular relations thereof can be varied for various steering relations.

The pedal 98, normally held in an angular position as illustratively shown in Fig. 1, rotates with the shaft 99 which also has the cranks 100 and 101 rotatable therewith.

Normally, the spring 102 sets the brake 103 on the brake wheel 104 of the motor N and thereby automatically prevents the vehicle from being moved or propelled as long as the pedal 98 is in normal position.

When the free end of the pedal 98 is moved toward the platform 105 which may serve as an operator's platform, the shaft 99 is moved rotatively and the cranks 100 and 101 are thereby simultaneously moved arcuately.

The movement of the crank 100 moves the connector 106 and the crank 107 and thereby puts the electric circuit into condition to be controlled by the mechanism in the controller V as is well known in the art so that the operation of the motor N can be controlled to propel the vehicle through the gearing described above.

The movement of the crank 101 moves the connector 108 and the crank 109 and thereby rotates the brake expander 110 and thereby forces the brake 103 away from the wheel 104 and releases the brake effect so that the motor N can operate freely.

The release of the brake 103 and putting the controller V into motor controlling condition are attained simultaneously when the pedal 98 is depressed and the setting of the brake 103 and putting the controller out of motor controlling condition are attained simultaneously when the pedal 98 is released and permitted to return to its normal position.

The controller W is mounted on the plate 111 and the bracket 112 is also mounted on this plate and both move with the same as it is moved by movement of the platform.

The bar 113 is longitudinally movable in the bosses 114 on the bracket. The spring 115 is telescoped over the bar with one end thereof abutting one of the bosses 114 and the other end abutting the collar 116 on the bar and normally tends to move the bar longitudinally downwardly.

The bracket 117 is secured to the front of the framing and the adjusting screw 118 is threaded therein in alignment with the bar 113.

The contact roller 119 is journaled in the end of the arm 120 which pivots at 121 and has the toe 122.

In the drawings, more particularly in Fig. 6, the platform is shown as being in load carrying position.

When the platform is in this position, the lower end of the bar 113 abuts the adjusting screw 118 endwise and the upper end of the bar 113 abuts the toe 122. The mechanism in the controller W and on the arm 120 is so arranged that the motor P can not be started while the bar 113 is in the position shown.

When the platform is swiveled on its pivot, manually or otherwise, so that the front end thereof moves arcuately upward or into load receiving or load discharging position the controller and bracket thereon moves with it whereupon the lower end of the bar 113 recedes from the positionally fixed adjusting screw 118 and the spring 115 moves the bar longitudinally downward and thereby recedes from the locking position on the toe 122 and thereby swivels the arm 120 and moves the mechanism in the controller so that the motor P can be controlled by operation of the handle 123.

When the front end of the platform is lowered into load carrying position and just before it reaches the contact seat 77, the lower end of the bar 113 contacts the upper end of the positionally fixed adjusting screw and thereby moves the bar upwardly against the action of the spring 115 and into the position shown in the drawings so that the upper end of the bar moves the toe and the mechanism connected therewith into non-control condition for the motor and retains it there until the front end of the platform is raised again.

By this means, the motor P can not be operated while the platform is in load carrying position but can be operated while the platform is in load receiving or load discharging position.

The motor P rotates the sheave wheels 61 and thereby winds or unwinds the cable 62 onto or from the same to move a load onto or from the platform.

The motor N rotates the drive wheels L through the controller V.

When a load is to be moved onto the platform, the vehicle is propelled by the motor N and steered so that the rear end (76) of the platform is adjacent to the load. The platform is then swiveled or tilted so that the end thereof touches the floor; the vehicle can then be propelled further so that the pointed end of the platform contacts the load when there is no space between the floor and the load; when the bottom of the load is some distance above the floor, the vehicle can be propelled further so that the end 76 reaches under the load.

The pedal 98, previously pressed down to release the brake 103 and to put the controller V into motor controlling condition to permit the propulsion of the vehicle, is now released whereby the spring 102 automatically sets the brake 103 and locks the controller V against controlling the motor N so that the vehicle remains in the position moved into.

The loop portion of the cable 62 is then slung around the back of the load. As explained above, the controller W is in condition to control the motor P when the front end of the platform is moved upward into the position it is in now; therefore, the motor P can now be operated to wind the cable 62 onto the sheave wheels 61 and thereby move the load onto the platform.

Normally, the spring 124 sets the brake 125 of the motor P and thereby prevents rotation of the sheave wheels. The solenoid 126 is inserted in series with the motor P in the electric circuit for the motor P and normally does not act on the brake. When the controller W is operated to control the motor P, the solenoid is energized automatically and swivels the end 127 of the lever 128 upwardly on the pivot 129 against the action of the spring and thereby releases the brake and holds the same released while the motor is operating but the spring 124 automatically sets the brake again when the motor stops operating. Therefore, inoperation of the motor automatically retains the load in any position either completely or part way on the platform.

As the load is so moved onto the platform and when it reaches a position thereon where the center of gravity of the load, aided by the eccentricity of the pivot point and center of gravity of the platform explained above, is forwardly beyond the pivot point of the platform, the front end of the platform will be moved or swiveled or tilted downwardly and thereby automatically stops the operation of the motor P and sets the brake 125 as explained above and thereby holds the load on the platform in that position.

If, for any reason, the bar 113 did not effect the locking of the control means for the motor P and the motor keeps on operating and moves the load further forward on the platform, the load will contact the roller 119 directly and move the same forwardly and thereby effects the stopping of the motor P in place of the bar before the motor can move the load into a damaging position.

When a load is to be discharged from the platform, it is not necessary to use the motor P since the platform is inclined and the load will move off of the platform automatically when it is released.

When the bar 130 is pushed inwardly the crank 131 rotates the pin 132 and thereby moves the crank 133 which moves the bar 134 and the end 135 of the lever 136 downwardly against the action of the spring 124 and thereby releases the brake 125. As soon as the bar 130 is released, the spring 124 automatically sets the brake again. By this means, the movement of the load off of the platform can be controlled to a nicety; the brake can be controlled to permit the load to move slowly or quickly as desired, or to stop or start its movement at any time by pushing the rod various distances inwardly and thereby counteract all or any part of the force of the spring and thereby establish either various frictional contacts between the brake and the wheel thereof or to release the brake completely.

The brake means and the control means described above are safety means each of which can be used independently, or all can be used conjointly, or others can be used as equivalents or added to the ones shown and described.

After the load is off of the platform, the platform will automatically move into load carrying position as explained above.

In the vehicle shown and described, all of the wheels thereof remain on even or on uneven floors due to the vertically articulate frame structure; the vehicle is of minimum size to get into and out of small spaces due to the mounting of the power source and power means above and below the platform; the vehicle is dirigible and can easily move into or in or out of the smallest possible spaces due to the arrangement of the steering and drive wheels; the vehicle automatically locks itself against movement and can be moved only after an unlocking movement is performed; the propelling power means for the vehicle is under double manual control by the pedal 98 and the controller V; the load moving power means for the vehicle is under double manual control by the controller W and the bar 130 and is under automatic control by the roller 119 and the bar 113; the load moving means automatically locks itself when it is not operating and thereby retains a load in position; the load moving means is controllable to move a load off of the platform at a desired speed; the platform need not be extended to take on or discharge a load so that a minimum space is required for loading and unloading purposes; the platform is pivoted to tilt into load carrying and into load receiving and into load discharging positions; the platform automatically swivels into load carrying position either when no load is thereon or when a load is in proper position thereon; the platform is easily swivable manually for various positional advantages; sufficient safety means are provided to prevent the vehicle or the load from moving at undesirable times and to prevent the load from being moved beyond certain limits; and the platform automatically stops the operation of the load moving means when the load is in position thereon.

We are aware that our invention is applicable to vehicles other than the one shown and described and that changes and modifications can be made in the structure and in the arrangement of the elements shown and described within the scope of the appended claims; therefore, without limiting ourselves to the precise application of our invention nor to the precise structure and arrangement of our invention as shown and described.

We claim:—

1. A vehicle including an axle and driving wheels thereon, a truck forwardly of said axle, a truck rearwardly of said axle, a frame connecting said trucks, a platform pivoted onto said frame, the axis of the pivot located substantially vertically of said axle, and the outer end of one of said trucks and of said frame sloping downwardly to clear said platform when the same is pivoted so that one end thereof contacts a floor.

2. A vehicle including one driving axle, a framing hinged on said driving axle, steering wheels on said framing forwardly and rearwardly of said axle and spaced close to said axle to minimize the length of the vehicle, a propelling motor for the vehicle supported on said framing within the lateral boundaries thereof and geared to said axle to minimize the length of the vehicle, a load carrying platform extending over said framing and over said wheels and having a load handling means thereon, and a motor to operate said load handling means carried underneath said platform and within the lateral boundaries of said framing.

3. A vehicle including one driving axle, a framing hinged on said driving axle, steering wheels on said framing forwardly and rearwardly of said axle and spaced close to said axle to minimize the length of the vehicle, a propelling motor for the vehicle supported on said framing within the lateral boundaries thereof, a load carrying platform on said framing, and a power source for said motor carried by said framing and spaced above said platform to leave the entire platform surface free for load receiving and to minimize the lateral dimensions of the vehicle.

4. A vehicle including one driving axle, a framing hinged on said driving axle, steering wheels on said framing forwardly and rearwardly of said axle and spaced close to said axle to minimize the length of the vehicle, a load carrying platform on said framing and extending over said framing and over said wheels and having a load handling means thereon, a motor to propel the vehicle carried by said framing within the lateral boundaries thereof, a motor to operate said load handling means beneath said platform and within the lateral boundaries of said framing, and a power source for said motors carried by said framing and spaced above said platform to leave the entire surface of said platform free for load receiving and to minimize the lateral dimensions of the vehicle.

In testimony of the foregoing, we affix our signatures.

EUGENE W. SCHELLENTRAGER.
B. E. CLARKSON.